United States Patent

[11] 3,608,602

[72] Inventor Leonard C. Youngblood
 Grosse Pointe, Mich.
[21] Appl. No. 780,831
[22] Filed Dec. 3, 1968
[45] Patented Sept. 28, 1971
[73] Assignee Uniroyal, Inc.
 New York, N.Y.

[54] STONE REJECTING TIRE TREAD AND MOLD INSERT THEREFOR
 9 Claims, 14 Drawing Figs.
[52] U.S. Cl....................................................... 152/212,
 18/44
[51] Int. Cl......................................................... B60c 11/04
[50] Field of Search........................................... 152/209,
 212; 18/44

[56] References Cited
UNITED STATES PATENTS
2,637,362 5/1953 Briscoe et al. ................ 152/209
2,938,560 5/1960 Wallace et al. ................ 152/209
3,328,849 7/1967 Kanz et al. ..................... 18/44

Primary Examiner—James B. Marbert
Attorney—Norbert P. Holler

ABSTRACT: A pneumatic tire tread having traction groove formations designed to limit stone pickup and retention in service is disclosed, together with a mold insert construction therefor. Each such formation consists of increased depth groove section in one wall of which is provided an annular ridge surrounding an axial depression, and in the other wall of which is provided a registering annular channel surrounding an axial protuberance. "Dimpled" projections of the disclosed mold insert blades are used to create the formations, each of which "dimples" has the appearance, at one face of the respective blade, of an annular ridge surrounding a central depression, and at the reverse blade face, of a central protuberance surrounded by an annular channel. Advantages are greater blade strength and easier extraction of the cured tire from the mold, as well as enhanced stone rejection.

PATENTED SEP 28 1971
3,608,602
SHEET 1 OF 2
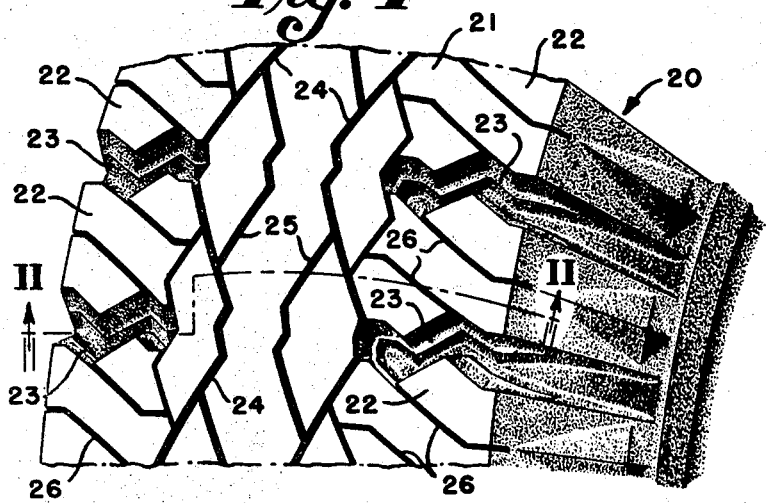
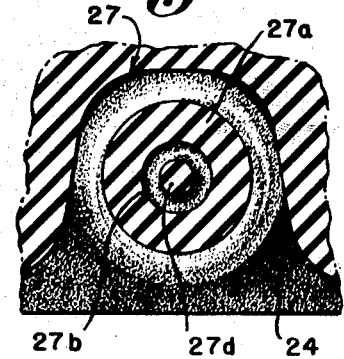
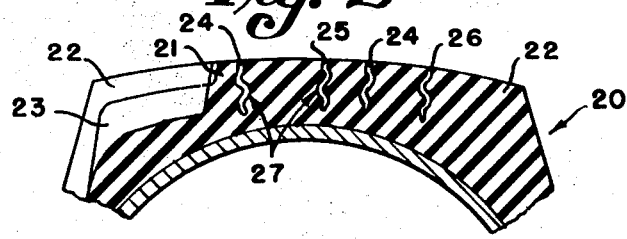
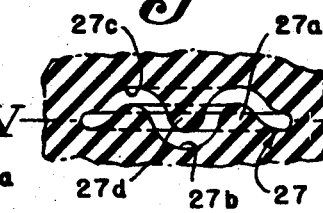
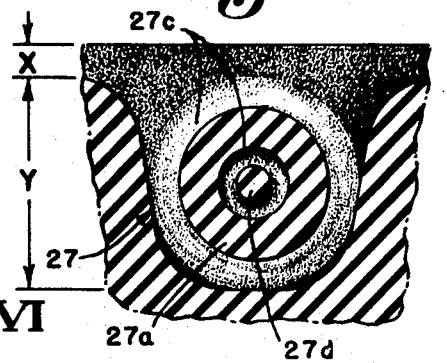
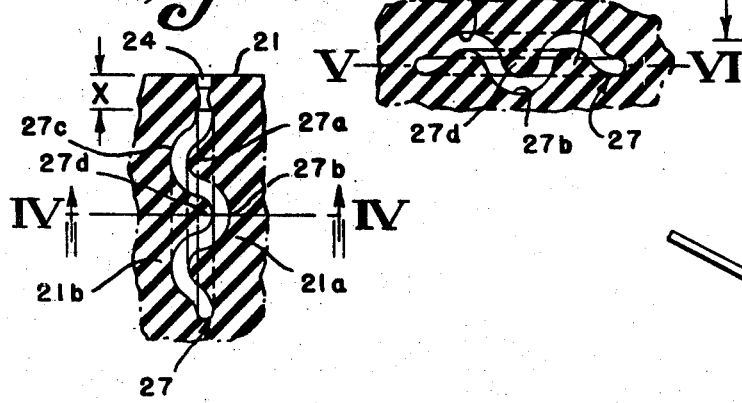
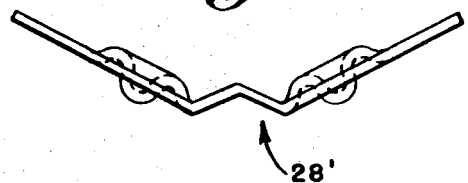
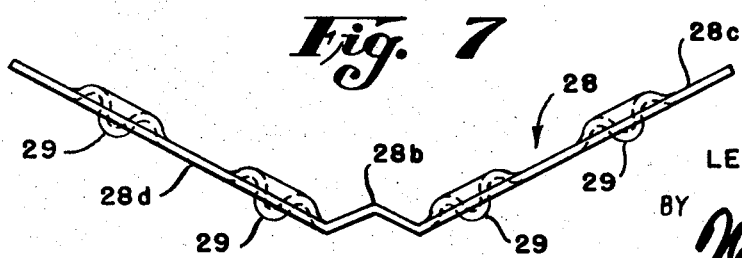
INVENTOR.
LEONARD C. YOUNGBLOOD
BY Norbert P. Holler
ATTORNEY.

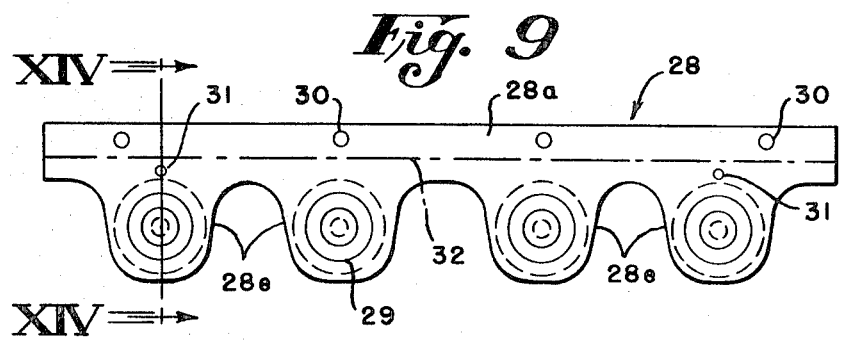
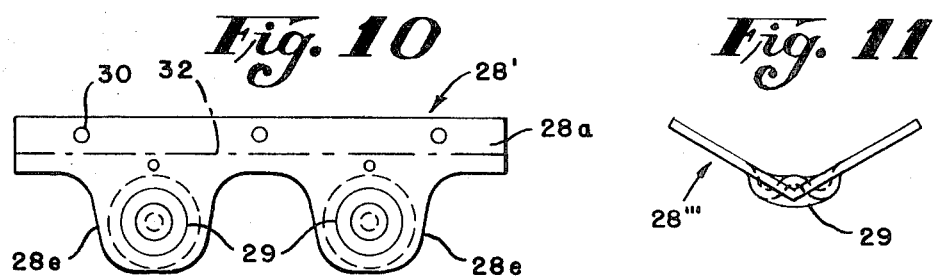
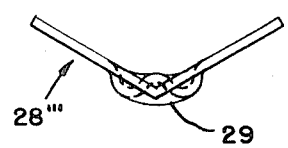
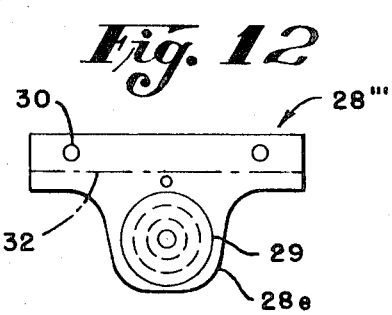
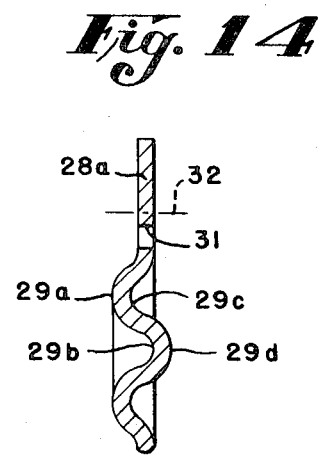
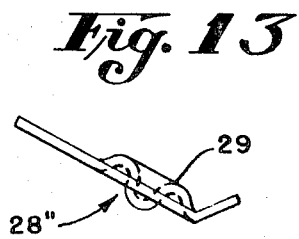
INVENTOR.
LEONARD C. YOUNGBLOOD
BY Norbert P. Holler
ATTORNEY.

STONE REJECTING TIRE TREAD AND MOLD INSERT THEREFOR

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to vehicle tires the treads of which include grooves designed to minimize stone pickup and retention.

The elastomeric treads of pneumatic tires are generally provided with large numbers of traction-enhancing grooves arranged in various desired patterns. Although no problem with stone pickup is ordinarily encountered with respect to relatively wide and deep grooves in the tread, it is found that relatively narrower grooves, usually referred to as "slots," are highly susceptible to stone pickup when the tire is in service. Stones so picked up and retained cause abrasive and abnormal flexing in the bases of the slots resulting in the development of cracks and like defects commonly termed "groove cracking," by virtue of the fact that the stones have a tendency to drill themselves inwardly of the slots.

Attempts have heretofore been made to cope with this problem. One of the proposed solutions has involved the provision, in the tread groove walls, of undulations or corrugations extending radially of the tire. Another proposed solution has involved the provision, in tread groove walls, of a generally circumferentially extending projection or ridge in one groove wall cooperating with the oppositely disposed groove wall to define a constricted region of the groove. Neither of these expedients appears to have been widely accepted by the tire industry, in the case of the former probably by virtue of the fact that the radially extending sinusoidal corrugations have not offered adequate resistance to inward movement of the stones, and in the case of the second expedient probably by virtue of the fact that the manufacture of such tires, although these are somewhat more resistant to stone pickup and stone drilling, has suffered from the disadvantage that it is difficult to remove a tire with such a constricted groove construction from the mold without running the risk of tearing the tread and bending or even breaking the mold insert blades or sipes used to form the grooves.

It is an object of the present invention, therefore, to provide a novel stone rejecting tire tread which is free of the disadvantages and drawback inherent in the known tread designs of this type.

It is another object of the present invention to provide a novel class of mold insert blades for use in the formation of such treads.

The foregoing and other objects, characteristics and advantages of the present invention will be more clearly understood from the following detailed description thereof when read in conjunction with the accompanying drawings, in which:

FIG. 1 is a fragmentary perspective view of a tire the tread of which has grooves designed in accordance with the principles of the present invention;

FIG. 2 is a fragmentary sectional view taken along the line II—II in FIG. 1;

FIG. 3 is a fragmentary, enlarged view of a portion of the tread region shown in FIG. 2;

FIG. 4 is a sectional view taken along the line IV—IV in FIG. 3;

FIGS. 5 and 6 are fragmentary sectional views taken, respectively, along the line V–VI in FIG. 4, FIG. 5 being the view seen when looking down along said line, and FIG. 6 being the view seen when looking up along said line;

FIGS. 7 and 8 are plan views, respectively, of two variants of the basic mold insert blade construction according to the present invention;

FIGS. 9 and 10 are developed side elevational views of the mold insert blades shown in FIGS. 7 and 8, respectively, and illustrate the same prior to the bending thereof into their final configurations;

FIG. 11 is a plan view of another variant of the basic mold insert construction according to the present invention;

FIG. 12 is a developed side elevational view of the mold insert shown in FIG. 11 prior to the bending thereof into its final configuration;

FIG. 13 is a plan view of yet another variant of the basic mold insert construction according to the present invention; and FIG. 14 is a sectional view, on an enlarged scale, taken along the line XIV—XIV in FIG. 9.

Referring now to the drawings in greater detail, for the purposes of illustration only, the present invention is shown as being embodied in a mud and snow tire 20 (FIGS. 1 and 2) having a tread 21 characterized by the provision, at the opposite sides of the tire, of relatively heavy cross lugs 22 separated from one another by relatively wide and deep grooves 23. The tread 21 is further shown as provided over the remainder of its surface with a plurality of relatively narrower grooves or slots 24, 25 and 26. Of these, the grooves 24 and 25 are shown as symmetrically shaped, each having two arms of equal length on either side of a central "bend" region, while the grooves 26 are shown as asymmetrically shaped, each having two arms of unequal length on either side of a bend. Each such groove has associated therewith one or more stone rejecting formations 27 the shapes and locations of which will be more fully described presently. It will be understood, of course, that the actual number of such formations associated with any given groove will generally depend on the length of the groove, the formation size, and the desired spacing of adjacent formations.

As clearly shown in FIG. 2, the stone rejecting formations 27 of the various grooves are all substantially identical. Thus, a description of one will suffice for all.

Referring now to FIGS. 3 to 6, each of the formations 27 associated with the groove 24 (only one is illustrated as an example) is constituted by an increased depth groove section, in the walls 21a and 21b of which are provided registering annular undulations comprising, on the one hand, an annular ridge 27a surrounding an axial depression 27b in the groove wall 21a, and, on the other hand, an annular depression 27c surrounding an axial protuberance 27d in the groove wall 21b. In general terms, the tread groove may be considered as having a basic depth $x$ (see FIGS. 3 and 6) which increases to $x+y$ at the location of each formation 27, $y$ being essentially the outer diameter of the annular space defined by the registering undulations in the groove walls. The dimensional characteristics of the formation 27 will of course, vary in different size tires and even in any one tire depending on the type and size of the groove involved. Merely by way of example, in a 10.00– 20 mud and snow tire utilizing grooves 24, 25 and 26 with dimension $x$ equal to about one-sixteenth inch, dimension $y$ may range from about 5 to 12 times $x$, and the edges of the enlarged depth groove sections may be oriented at angles between about 10° and 15° to the radial direction. For other tire sizes, these ratio and angle values may be somewhat larger or smaller, as the situation demands.

The manner in which these tread grooves are given their intended configurations and dimensions involves the use of mold insert blades of the class illustrated in FIGS. 7 to 14 and embodying the principles of the present invention. Thus, the grooves 24 are formed with the aid of a mold insert 28 such as is shown in FIGS. 7 and 9 and comprises an elongated planar metal bar 28a which is centrally bent at 28b to define two equal length arms 28c and 28d symmetrical with respect to the bend. The bar is straight at one longitudinal edge and at its opposite edge is provided with four projections 28e coplanar with the bar, each of which projections has a pair of lateral edges converging at a low angle toward one another in the direction away from the bar 28a, and each of which further presents a "dimple" or annular corrugation 29 (see also FIG. 14) consisting of an annular ridge 29a surrounding a central axial depression 29b at one face of the projection and of a corresponding annular channel 29c surrounding a central axial protuberance 29d at the other face. The grooves 25 are formed with the aid of a mold insert 28' such as is shown in FIGS. 8 and 10 and which basically differs from the insert 28 only in that the arms are shorter and are provided with only one dimpled projection each. The grooves 26 are formed with the aid of a mold insert 28'' such as is shown in FIG. 13 and which is essentially a one-half section of the insert 28'. A mold insert 28''' such as shown in FIGS. 11 and 12, having only one projection 29 like the blade 28'' but centered rather than offset as in the latter, would be used where it is desired to introduce a stone-rejecting formation into the bend of a groove, for example a relatively short groove resembling the V-shaped central bent regions of the grooves 24 and 25.

Quite obviously, more than one or two projections may be provided at each arm of any of these types of blades, the arms of any one blade such as 28 or 28' may be of different lengths and have different numbers of projections associated therewith, and any such blade may also have one of its projections located at the bend as in the case of the blade 28'''. Where the basic groove design is other than as illustrated, of course, the blades will be bent or otherwise shaped as required.

It will be noted that the mold insert blades described herein are also provided with apertures 30 in the region of the bar 28a and apertures 31 in the regions of some or all of the projections 28e. The apertures 30 are anchor holes used to secure the blades to the mold, and the apertures 31 are vent holes to enable pockets of gaseous fluids in the mold to be vented during a curing operation. In normal use, such a blade would be mounted so as to intersect the mold surface along a line, schematically indicated by a dot-dash line 32 in FIGS. 9, 10, 12 and 14, preferably about 0.06 inch from the straight edge and at most tangent to the apertures 31.

Mold blades constructed according to the present invention are found to be considerably stronger in the dimpled insert tabs 28e, i.e., in those parts used to define the stone-rejecting groove formations, than heretofore known blades, since the tabs can resist bending forces from any planar angle and thus are more resistant to distortion and breakage during the extraction of the cured tire from the mold. Inasmuch as the extraction operation itself is also very easy since there are no longitudinal lines of resistance, appreciable production economies are attained by virtue of the fact that both the incidence of defective tires and the frequency of blade replacement are considerably reduced. At the same time, the treads characterized by the annularly corrugated groove formations provided by the use of blades according to the present invention are found to be more resistant to stone pickup and retention than treads characterized by the known formations, since regardless of the angle of attack, the stones must overcome several restricting ridges and traverse a plurality of channels in order to reach the groove base, whereby the service life of such tires is increased.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

Having thus described my invention, what I claim and desire to protect by Letters Patent is:

1. In a tire having a tread provided with traction-enhancing grooves in the road-contacting surface thereof; the improvement comprising at least one of said grooves having an increased depth section coextensive with less than full length portion of the groove, said section having an annular undulation therein defined by an annular ridge surrounding an axial depression on one sidewall of the section and a registering annular channel surrounding an axial protuberance on the opposite sidewall of the section.

2. A tire according to claim 1, wherein the depth of each such groove section is a predetermined amount greater than the normal depth of the respective groove.

3. A tire according to claim 2, wherein the opposite end edges of each such groove section converge toward one another at a small angle to the tire radius in the radially inward direction of the tire.

4. A tire according to claim 1, wherein at least said one groove is provided with a plurality of said sections, adjacent ones of which are spaced from one another by a normal depth section of said groove.

5. A tire according to claim 4, wherein the depth of each of said increased depth sections is at least several times the normal groove depth.

6. A tire according to claim 5, wherein the opposite end edges of each of said increased depth sections converge toward one another at a small angle to the tire radius in the radially inward direction of the tire.

7. A tire mold tread groove forming insert blade, comprising a bar having one straight edge and an opposite edge provided with at least one projection coextensive with a portion of the bar length and coplanar with said bar, said projection having within its confines an annular dimplelike corrugation consisting of an annular ridge surrounding an axial depression at one face of the projection, and in registry therewith of a corresponding annular channel surrounding an axial protuberance at the opposite face of the projection, the axis of said dimplelike corrugation being perpendicular to the plane of said projection.

8. A tire mold insert blade according to claim 7, wherein the opposite edges of said projection converge toward one another at a small angle to the normal to said bar in the direction away from the latter.

9. A tire mold insert blade according to claim 7, wherein the maximum dimension of said projection normal to said bar is at least a predetermined amount greater than the corresponding dimension of said bar in a region where no projection is present.